May 8, 1962     B. H. KING     3,034,001
VIBRATION DETECTOR
Filed May 21, 1958
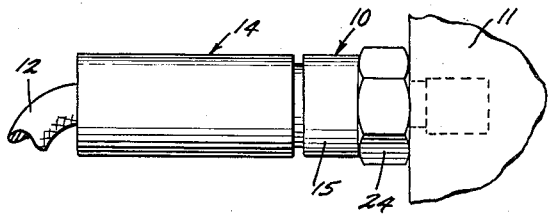
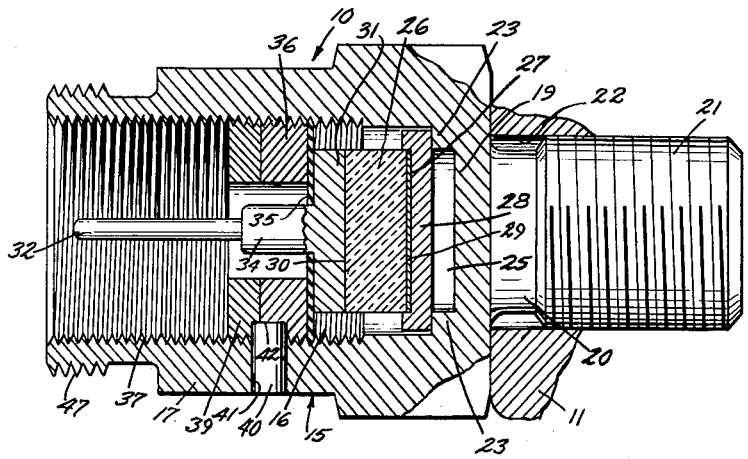
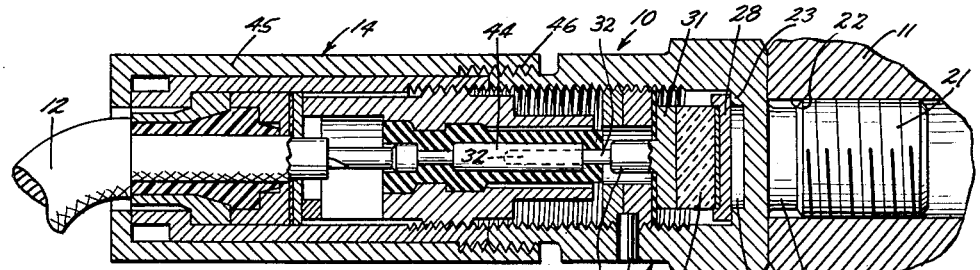
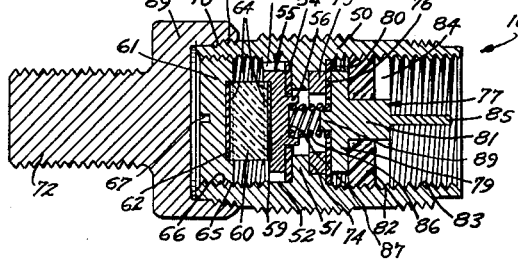
INVENTOR.
BLAINE H. KING
BY
ATTORNEYS

United States Patent Office 3,034,001
Patented May 8, 1962

3,034,001
VIBRATION DETECTOR
Blaine H. King, Unadilla, N.Y., assignor to The Bendix Corporation, a corporation of Delaware
Filed May 21, 1958, Ser. No. 736,873
7 Claims. (Cl. 310—8.7)

This invention relates to a novel vibration detecting transducer.

The invention has among its objects the provision of a novel vibration detecting transducer.

Other objects of the invention are the provision of a transducer which is capable of use at elevated temperatures, which is compact, and which produces voltages of such value as not to require undue amplification of them in order to detect and record the transducer signals accurately.

Still another object of the invention is the provision of a transducer which is simple, rugged, economical, and capable of long use while remaining substantially constant in its signal-producing properties.

The above and further objects and novel features of the present invention will be more fully apparent from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views—

FIG. 1 is a view in side elevation of an illustrative embodiment of transducer made in accordance with the invention, the transducer being mounted on a fragmentarily shown vibration producing device such as an engine, an electrical connector part being shown connected to the transducer body or transducer proper;

FIG. 2 is an enlarged view in axial section through the transducer body, certain of the parts being shown in elevation;

FIG. 3 is a view in axial section through the assembly of transducer body and electrical connector part shown in FIG. 1, certain of the parts being shown in elevation; and FIG. 4 is a view in axial section through a modified transducer body made in accordance with the invention.

The illustrative transducer shown may be employed to advantage in the detecting of vibrations in a member to which it is affixed or on which it is mounted. One such use of the transducer is a "pick-up" for an analyzer for internal combustion piston engines. In such use the transducer produces a readable and/or recordable signal for each engine explosion. Because the engine operates at elevated temperatures, and the transducer is supported thereon, the transducer is necessarily subjected to elevated temperatures during use. Such elevated temperatures, and the marked vibrations to which the transducer is subjected, have heretofore necessitated the use of electromagnetic transducer or "pick-up" devices for engine vibration detecting use.

Electromagnetic transducers are of necessity somewhat bulky. Not only that, but they are delicate, expensive, and inherently produce a rather weak signal, thus requiring substantial amplification to be readable and/or recordable.

The transducer of the present invention employs a piezo-electric crystal which withstands elevated temperatures for long periods of time, and which does not noticeably deteriorate during long service. The transducer of the invention is simple, rugged, economical, and produces a strong signal which does not require undue amplification.

Turning now to the drawings, the first illustrative transducer body or transducer proper made in accordance with the invention is designated generally by the reference character 10. The transducer 10 is shown in FIGS. 1, 2 and 3 as mounted on a fragmentarily shown member 11, which may be the block of an internal combustion piston-type engine such as an automobile or airplane engine. The electrical output of the transducer is led therefrom through an insulated wire 12, the wire being connected to the output terminal of transducer 10 by a separable electrical connector part the shell of which is designed to be secured to the shell of the transducer body 10. The resulting assembly is compact, simple, and protected against mechanical damage.

Transducer 10 has a generally cylindrical cup-like body 15 having a central axially extended recess 16 therein. Body 15, which is made of metal such as steel, has a side wall 17, and a relatively thick end or bottom wall 19. Projecting axially from bottom wall 19 is a circular cylindrical stem 20 of relatively large diameter, the outer end of the stem 20 being enlarged and threaded at 21. Portion 21 of the stem is threaded into a convenient opening 22 in supporting member 11. To provide a convenient wrench-engaging portion on body 15 of the transducer, the zone 24 thereof radially outwardly of bottom wall 19 and extending some distance therefrom along the side wall of recess 16 is of somewhat enlarged, hexagonal configuration.

The inner surface of end wall 19 is shallowly centrally recessed at 25 to form an annular shoulder 23. Supported on shoulder 23 is a rigid metal disc, made for example of steel. The upper face of disc 28 is shallowly recessed to receive and center the inner end of a piezo-electric crystal 26. Crystal 26 in the embodiment shown is of cylindrical disc-like shape; the inner edge of crystal 26 fits snugly within the recess in disc 28. Interposed between the crystal and the bottom of such recess is a thin layer 27 of relatively soft, highly electrically conductive metal such as copper, which provides for a good electrical contact over an extended area between the inner face 29 of crystal 26 and disc 28. The disc 28 allows crystal 26 to be substantially isolated from distortions in end wall 19 that arise from the end abutment of wall 19 with the member 11. Such distortions vary, depending upon the force with which stem 20 is screwed into member 11.

Overlying the other, outer broad face 30 of crystal 26 is a relatively thick disc 31 of relatively soft and highly electrically conductive metal such as copper. A central pin connector 32 has its enlarged base 34 connected as by being brazed to disc 31. Pin connector 32 is centered by an insulating disc 35 having a central opening receiving member 34 and having its outer edges engaging the side walls of recess 16. Disc 31 is maintained in forcible contact with face 30 of the crystal by an internal nut 36 screwed into the side wall of recess 16, such side wall being threaded as shown at 37. Nut 36 overlies insulating disc 35, which is interposed between the disc 31 and nut 36. Thus the outer end of crystal 26, disc 31, and connector pin 32 are insulated from the body 15 of transducer 10. In the assembly of the transducer nut 36 is screwed into body 15 so as to place the crystal 26 under a predetermined stress with body 15 at ambient temperature and free from vibration.

Nut 36 is maintained in such position by a second, outer locking nut 39 which is screwed into body 15 into forcible contact with nut 36. A pin 40 having a force fit with an opening 41 through the side wall 17 of body 15 extends into a recess 42 extending into the sides of nuts 36 and 39 to secure them in place. Preferably opening 41 is drilled into sidewall 17 of the body 15 prior to assembly of the crystal, the pin connector, and the nuts therein. After the nuts 36 and 39 have been assembled in body 15 as described, the recess 42 may be formed in nuts 36 and 39 by drilling through opening 41. Following this, the pin 40 is pressed into opening 41 and recess 42.

The body 15 of the transducer is formed to receive a part 14 of a separable electrical connector bearing a contact socket 44 which receives and makes electrical connection with contact pin 32. Connector part 14 has an outer metallic shell 45 within which socket contact 44 is supported in a conventional manner so as to be insulated therefrom. As shown, lead wire 12 is attached to socket 44. The inner end of shell 45 is internally threaded at 46 to receive the externally threaded outer end 47 of body 15 of the transducer, whereby the body 15 and connector part 14 are securely retained together.

The piezo-electric crystal 26 is made of a material which generates appreciable voltage when subjected to distorting stresses, and, for high temperature uses, which successfully withstands elevated temperatures for prolonged periods of time. A crystal which has proved to be entirely satisfactory for this purpose is one made of lead metaniobate, which is manufactured and sold by the General Electric Company. Lead metaniobate has a Curie point of about 1050° F., and produces a linear voltage output at temperatures of 400° F. and above.

For transducers employed at ambient and moderately elevated temperatures, a crystal 26 made of barium titanate is entirely satisfactory.

When a transducer such as that shown at 10 is affixed to a vibrating structure, its inertia tends to make it lag slightly behind the vibrations of the supporting structure. Thus body 15 is subjected to bending and/or torsional stresses, and such stresses are transmitted to the crystal 26 tightly clamped in body 15. The minute elastic distortions of the crystal 26 produce potential differences between the faces 29 and 30 of the crystal which are in phase with and proportional to the stresses applied to the crystal. Thus the voltage generated by the crystal, as measured between ground (support 11 and body 15 of the transducer) and lead wire 12, when suitably amplified may be read and/or recorded to give the time and amplitude of the vibrations being measured.

In FIG. 4 there is shown a second embodiment of vibration detecting transducer made in accordance with the invention. Such transducer is indicated generally by the reference character 10'.

Transducer 10' has a hollow metallic shell 50 having an inwardly projecting annular flange 51 located intermediate its ends to define a forward cavity and a rear cavity, the rear cavity 52 receiving the vibration detecting crystal and its holding means, now to be described. Positioned within cavity 52 and against flange 51 is a heat resistant insulating washer 54, made of mica or the like. A crystal holder 55 has its radially outwardly projecting flange 57 abutting washer 54, the central boss 56 of holder 55 projecting through the central opening in washer 54, and through the central opening in flange 51 and spaced from the wall of such opening in the flange.

The vibration detecting crystal 60 is, as before, in the form of a relatively thick circular cylindrical disc. Such crystal is retained between member 55 and a pressure adjusting nut 61 by having shallow opposite end portions of the crystal received in recesses 59 and 62 in the confronting faces of members 55 and 61, respectively. To cushion the crystal somewhat, as well as to improve the electrical contact to its faces, thin discs 64 of metal such as copper are positioned in recesses 59 and 62 between the bottom surfaces of the recesses and the crystal. Nut 61 is retained in cavity 52 of shell 50 by threads 65 on the nut which are engaged with threads 66 on the shell. The nut 61 may be screwed into the shell, to impose the desired pressure upon the crystal, by engaging the slot 67 in the nut 61 with a suitable tool such as a screwdriver.

The cavity 52 is closed by a cup-like member 69 having internal threads 70 on the side wall thereof engaged with external threads 71 on the end of shell 50. A threaded stem 72 projecting centrally from member 69 allows the attachment of the transducer to a member such as an engine block in the same manner as with the first described embodiment. The construction of the transducer is such that the crystal 60 is effectively isolated from distortions of member 69 and of shell 50 which may be caused by screwing stem 72 into the member such as an engine block, and by engagement of the broad surface of member 69 with the engine block.

The other, forward cavity in shell 50 has an inner annular seat 74 therein adjacent flange 51, and an outer, larger annular seat 80. A metal washer 75, made for example of steel, is positioned in seat 74. Against washer 75, and within seat 80 there is positioned a heat resistant washer 76, made for example, of mica. The central opening in washer 75 has the inner sidewall thereof spaced from boss 56 on member 55.

A contactor member 77 is positioned in the forward cavity in shell 50, the flange 79 of the contactor being received in annular recess 80 in the shell. Member 77 is held in position by an insulating retaining nut 82, made for example of a molded resin, a central boss 81 on member 77 being received in a hole through nut 82. Threads on nut 82 engage internal threads 83 on the shell, as shown. The nut 82 may be screwed into the shell as by engagement of slot 84 on the nut by a suitable tool, such as a screwdriver.

Electrical connection between the members 55 and 77 is effected by a coil compression spring 86, the inner end of which is received in a cup-like spring seat 87 on the end of boss 56, and the outer end of which receives a boss 89 on member 77 within it. The electrical output from crystal 60 is led from the transducer through a central contact pin 85, which mates with a socket contact (not shown) of a separable connector part removably mounted in the internally threaded outer end of the shell 50.

Although only a limited number of embodiments of transducer have been illustrated in the accompanying drawings and described in the foregoing specification, it is to be expressly understood that various changes, such as in the relative dimensions of the parts, materials used, the positioning of the transducer on the supporting member, as well as in the suggested manner of use of the transducer of the invention, may be made therein without departing from the spirit and scope of the invention as will now be apparent to those skilled in the art.

What is claimed is:

1. A vibration detecting transducer, comprising a housing having a cup-like end portion having an end wall integral therewith, a transducer mounting stem-like means extending outwardly at least substantially axially from the end wall of the housing, a first broad plate member positioned within the housing parallel to the end wall of the housing, means on the housing engaging the first plate member adjacent its edge to support it and maintain it spaced from the end wall of the housing so that the first plate member is substantially isolated from distortions in the end wall caused by mounting the transducer by the stem-like means on a supporting member, a piezo-electric crystal within the housing, said crystal having broad generally flat opposite faces, the crystal being positioned with one broad face thereof against and in compressive relationship with the inner side of the first plate member, a second plate member disposed with a broad surface against and in contact with the other face of the crystal, means to thrust the second plate member, the crystal, and the first plate member together and against the means on the housing supporting the first plate member, and means providing electrical leads from said opposite faces of the crystal.

2. A vibration detecting transducer as defined in claim 1, wherein the means thrusting the second plate member against the crystal is an internal nut having threaded engagement with the inner sidewall of the housing.

3. A vibration detecting transducer as defined in claim 2, wherein the nut is hollow, and the means providing an electrical lead from said other face of the crystal includes a conductor member extending through said hollow nut.

4. A vibration detecting transducer as defined in claim 1, wherein the means thrusting the second plate member against the crystal comprises an abutment in the housing and an insulating means held in compression between the abutment and the second plate member.

5. A vibration detecting transducer as defined in claim 4, wherein the abutment has screw threaded engagement with the wall of the housing and is adjustable longitudinally thereof.

6. A vibration detecting transducer as defined in claim 1, wherein the means supporting the first plate member is an annular shoulder extending around the end wall of the housing and engaging a peripheral zone of the outer side of the first plate member.

7. A vibration detecting transducer as defined in claim 1, wherein the means supporting the first plate member is composed of a threaded connection between the periphery of the first plate member and the inner sidewall of the cup-like end portion of the housing.

References Cited in the file of this patent
UNITED STATES PATENTS

| | | |
|---|---|---|
| 2,068,744 | Gutzke | Jan. 26, 1937 |
| 2,096,826 | Schrader | Oct. 26, 1937 |
| 2,202,220 | Miller | May 28, 1940 |
| 2,248,574 | Knight | July 8, 1941 |
| 2,250,496 | Postelethewate | July 29, 1941 |
| 2,454,264 | Stigter | Nov. 16, 1948 |
| 2,914,686 | Clements | Nov. 24, 1959 |